(12) United States Patent
Saikatsu et al.

(10) Patent No.: US 7,993,446 B2
(45) Date of Patent: Aug. 9, 2011

(54) DISPERSING AGENT FOR ORGANIC PIGMENT AND USE THEREOF

(75) Inventors: Hiroaki Saikatsu, Chuo-ku (JP);
Hiromitsu Yanagimoto, Chuo-ku (JP);
Naoto Kamata, Chuo-ku (JP); Michiei Nakamura, Chuo-ku (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 56 days.

(21) Appl. No.: 12/449,361

(22) PCT Filed: Jan. 30, 2008

(86) PCT No.: PCT/JP2008/051343
§ 371 (c)(1),
(2), (4) Date: Aug. 4, 2009

(87) PCT Pub. No.: WO2008/099671
PCT Pub. Date: Aug. 21, 2008

(65) Prior Publication Data
US 2010/0315733 A1 Dec. 16, 2010

(30) Foreign Application Priority Data
Feb. 14, 2007 (JP) .................. 2007-033998

(51) Int. Cl.
*C09B 67/20* (2006.01)
*C09B 67/22* (2006.01)
*C09B 67/46* (2006.01)
*G02B 5/20* (2006.01)
*G02B 5/22* (2006.01)

(52) U.S. Cl. ........ 106/496; 106/413; 106/474; 106/476; 106/494; 106/498; 252/582; 252/586; 359/891; 427/162; 430/7; 534/604; 534/606; 534/616; 534/653; 534/751; 534/752

(58) Field of Classification Search .................. 106/413, 106/474, 476, 493, 494, 496, 498; 252/582, 252/586; 359/891; 427/162; 430/7; 534/604, 534/606, 616, 653, 751, 752
See application file for complete search history.

(56) References Cited

U.S. PATENT DOCUMENTS

| | | | |
|---|---|---|---|
| 2,061,126 A | 11/1936 | Zahn et al. | |
| 4,310,359 A | 1/1982 | Ehashi et al. | |
| 5,556,456 A | 9/1996 | Inoue et al. | |

FOREIGN PATENT DOCUMENTS

| | | |
|---|---|---|
| DE | 423394 | 1/1926 |
| EP | 1 146 094 A2 | 10/2001 |
| GB | 374548 | 6/1932 |
| GB | 448459 | 6/1936 |
| JP | 56-075654 A | 6/1981 |
| JP | 56-118462 A | 9/1981 |
| JP | 56-167762 A | 12/1981 |
| JP | 59-227951 A | 12/1984 |
| JP | 62-068855 A | 3/1987 |
| JP | 4-246469 A | 9/1992 |

(Continued)

OTHER PUBLICATIONS

Chemical Abstract No. 56:7626, Shishkina et al, "Structure and Reactions of Carbazole and its Derivatives. VIII. Products of the reaction of 3-aminocarbazole and 2-hydroxy-3-napthoic acid", Zhurnal Prikladnoi Khimii (Sankt-Peterburg, Russian Federation) 1961, 34, 1895-8 [no month].*

Chemical Abstract Accession No. 1963:55663, Document No. 59:55663, Murshtein et al, "Synthesis and Reactions of 3-nitro- and 3-amino-9-(cyanoethyl)carbazole", Zhurnal Prikladnoi Khimii (Sankt-Peterburg, Russian Federation) 1963, 36(3), 644-9 [no month].*

(Continued)

*Primary Examiner* — Anthony J Green
(74) *Attorney, Agent, or Firm* — Chapman and Cutler LLP

(57) ABSTRACT

This invention relates to a dispersant for an organic pigment comprising a compound represented by the below-described formula (1) or (2), and also to its use. According to the present invention, it is possible to provide a dispersant or the like, which can afford a coating formulation for a color filter. The coating formulation is prevented from an increase in viscosity and a reduction in storage stability even when the concentration of a pigment is high, and can fabricate the color filter with excellent transparency and color quality.

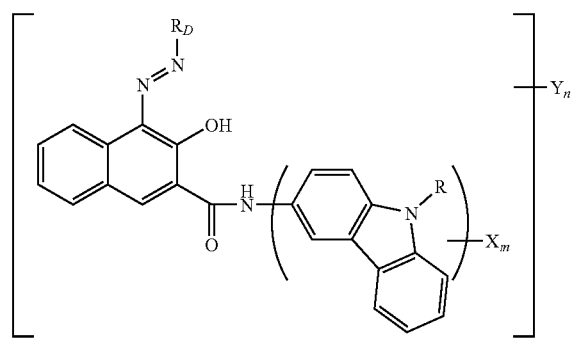

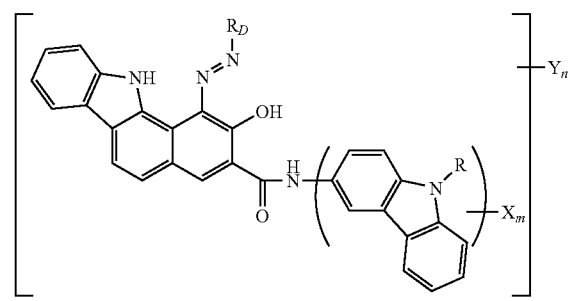

13 Claims, 9 Drawing Sheets

FOREIGN PATENT DOCUMENTS

| | | | |
|---|---|---|---|
| JP | 6-240161 A | | 8/1994 |
| JP | 6-240162 A | | 8/1994 |
| JP | 7-188576 A | | 7/1995 |
| JP | 2001-172520 A | | 6/2001 |
| JP | 2009-197213 A | * | 9/2009 |
| JP | 2010-65062 A | * | 3/2010 |

OTHER PUBLICATIONS

Chemical Abstracts, vol. 56, 1962, 1420a-c.

Chemical Abstracts, vol. 59, 1963, 10267d-f.

Shishkina, V.I., et al., Reaction Products of 3-Aminocarbazole and Beta-Hydroxynaphthoic Acid, Zhurnal Prikladnow Khimii, vol. 34, No. 8, Aug. 1961, pp. 1895-1898.

Murshtein, M.K., et al., Synthesis and Reactions of 3-Nitro- and 3-Amino-9-Cyanoethylcarbazole, Zhurnal Prikladnow Khimii, vol. 36, No. 3, Mar. 1963, pp. 644-649.

European Patent Office, Supplementary European Search Report for European Patent Application No. EP 08 70 4125, Jan. 27, 2011. European Patent Office, Munich, Germany.

* cited by examiner

DISPERSING AGENT FOR ORGANIC PIGMENT AND USE THEREOF

TECHNICAL FIELD

This invention relates to a dispersant for an organic pigment, a pigment composition, a pigment dispersion, a color coating formulation for a color filter (a color coating formulation colored with a pigment will hereinafter be called simply "a coating formulation"), a fabrication process of a color filter, a color filter, and a coupler.

BACKGROUND ART

Color filters employed in liquid crystal displays and the like are each primarily fabricated by applying a coating formulation, which is formed of a photoresist (photosensitive resin solution) and a pigment dispersed in the photoresist, onto a color filter substrate by the spin coating method, a coating method or the electrodeposition method, exposing the thus-formed color coating film to light through a photomask, and then developing the thus-exposed coating film to develop a pattern such that pixels are formed, that is, by a so-called pigment dispersion process (a process making use of a pigment as a colorant).

As a coloring pigment for a coating formulation to be used for the formation of blue pigments, a dioxazine violet pigment of a violet color (C.I. Pigment Violet 23) has been mixed and used for the purpose of color correction (color matching) in addition to $\epsilon$-phthalocyanine (C.I. Pigment Blue 15:6) as a blue pigment. Especially with a view to improving the blue pixels of color filters for TV monitors, the demand for which is markedly growing in recent years, into pixels of more preferred color quality, there is an outstanding requirement to increase the mixing ratio of the dioxazine violet pigment to $\epsilon$-phthalocyanine as a blue pigment.

Upon dispersing the above-described mixed pigment of the $\epsilon$-phthalocyanine pigment and the dioxazine violet pigment in a dispersion medium such as a photoresist, however, the mixed pigment cannot be fully dispersed when it is simply dispersed in a conventional disperser. If blue pixels are formed from the resulting coating formulation, the pixels lack optical transparency and have insufficient light transmittance as blue pixels for color filters. The coating formulation comprised of the above-described mixed pigment is, therefore, dissatisfactory as a blue-pixel-forming coating formulation for color filters.

As resins generally employed in photoresists as dispersion media for pigments, on the hand, acrylic polymers of high acid value are primarily adopted so that color coating films after exposure can be developed by an aqueous alkaline solution. However, a coating formulation comprised of the mixed pigment and a photoresist, which contains such an acrylic resin of high acid value, involves problems in that the pigment tends to undergo aggregation and the viscosity of the coating formulation tends to become higher and also that with time, the coating solution thickens and the storage stability of the coating formulation deteriorates.

Upon formation of pixels of the respective colors of a color filter with coating formulations accompanied by such difficulties as described above, the coating formulations employed are each applied onto a substrate by the spin coating method and the resultant coating film is then exposed to light and developed to form a pattern. When the coating formulations so employed have high viscosity or show thixotropic viscosity due to aggregation of their pigments, the color coating films (before their exposure) formed from the respective coating formulations swell up at central parts. Fabrication of a large-size color-filter, therefore, leads to a problem in that unevenness and a difference occur in color hue and color density, respectively, between pixels on a central part of the substrate and those on a peripheral part of the substrate.

Although each coating formulation for a color filter generally has a pigment concentration in a high concentration range of from 5 to 20 wt %, it is therefore necessary that its dispersion state is free from aggregation of pigment particles, its viscosity is low (for example, 5 to 20 mPa·s or so) compared with general room-temperature drying coating formulations or baking coating formulations, and it is excellent in storage stability.

To meet the above-described requirements, methods have been proposed to date for cases where the pigment is $\epsilon$-phthalocyanine (C.I. Pigment Blue 15:6), including the method that adds a substituted derivative of phthalocyanine blue or a substituted derivative of dioxazine violet as a dispersant to the pigment and the method that treats the pigment with the above-described derivative (see, for example, Patent Documents 1 to 6).

Patent Document 1: JP-A-56-167762
Patent Document 2: JP-B-1-34268
Patent Document 3: JP-A-4-246469
Patent Document 4: JP-A-6-240161
Patent Document 5: JP-A-6-240162
Patent Document 6: JP-A-7-188576

DISCLOSURE OF THE INVENTION

Problem to Be Solved

From a demand for further improvements in the performance of color filters, on the other hand, needs have arisen to improve the transparency of color pixels, to increase the contrast of light transmitted through the color pixels and to increase the pigment concentrations in color pixels. According to the above-described method that uses the pigment derivative as a dispersant for the dispersion of each pigment, it is difficult to avoid an increase in viscosity or a reduction in storage stability, which takes place due to an improvement in the transparency of color pixels by an improvement in the dispersibility of the pigment and due to an increase in the concentration of the pigment. There is, accordingly, an outstanding desire for the alleviation of such problems.

With a view to solving the above-described problems, which arise when the above-described pigment derivative is used as a dispersant for pigments upon preparation of coating formulations of high pigment concentration for color filters, and developing a pigment dispersant capable of achieving improvements in the color quality of the coating formulations for color filters and a reduction in their viscosity, the present inventors have conducted enthusiastic research. As a result, it has been found that certain specific azo pigment compounds can act as pigment dispersants in smaller amounts, can achieve reductions in the viscosity of coating formulations for color filters, can avoid thickening or gelling of the coating formulations during storage, and can also improve the transparency of color pixels, said transparency being most important as color filters, leading to the completion of the present invention.

The present invention provides a dispersant for an organic pigment, comprising a compound represented by the following formula (1) or (2):

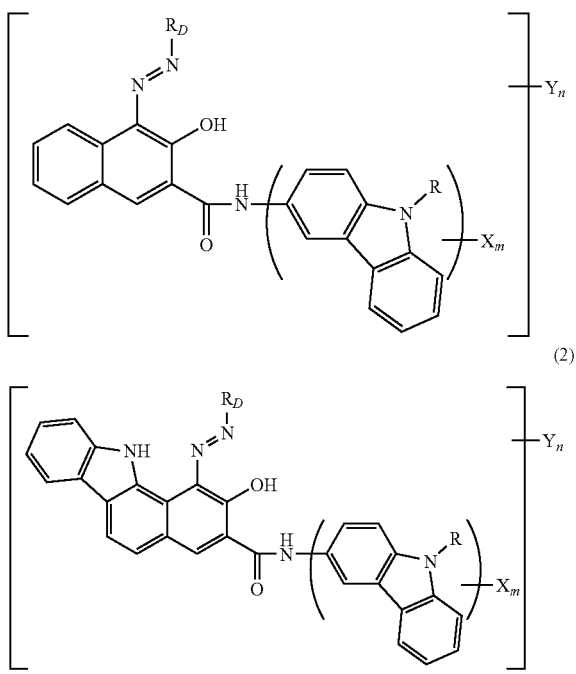

wherein $R_D$ represents an aromatic ring or aromatic heteroring having at least one kind of group, which is selected from the group consisting of a sulfonic group and metal salts, ammonia salts, organic amine salts and organic quaternary ammonium compound salts thereof, as many as from 1 to 3, substituents X and Y may be the same or different and each represent a halogen atom, hydroxyl group, nitro group, alkyl group, alkoxyl group, or substituted or unsubstituted phthalimidomethyl group, R represents a hydrogen atom or a $C_1$-$C_{12}$ alkyl group, and m and n are each an integer of from 0 to 3.

In the above-described dispersant, n and m may preferably be 0, and R may preferably be a hydrogen atom or a $C_1$-$C_4$ alkyl group; the organic pigment may preferably be at least one organic pigment selected from blue, violet, green and black pigments; the organic pigment may preferably be at least one organic pigment selected from blue and violet dioxazine pigments, blue, violet and green anthraquinone pigments, blue, violet and green azo pigments, blue and green phthalocyanine pigments, and a black carbon-black pigment; and the organic pigment may preferably be at least one organic pigment selected from dioxazine violet (C.I. Pigment Violet 23 (hereinafter called "PV23")), indanthrone blue (C.I. Pigment Blue 60 (hereinafter called "PB60")), ε-phthalocyanine blue (C.I. Pigment Blue 15:6 (hereinafter called "PB15:6")), chlorinated phthalocyanine green (C.I. Pigment Green 7 (hereinafter called "PG7")), brominated chlorinated phthalocyanine green (C.I. Pigment Green 36 (hereinafter called "PG36")), brominated phthalocyanine green, and carbon black (C.I. Pigment Black 7 (hereinafter called "PBk7")).

The present invention also provides a pigment composition comprising an organic pigment and the above-described dispersant of the present invention; and a pigment dispersion comprising a dispersion medium and an organic pigment dispersed with a dispersant in the dispersion medium, wherein the dispersant is the above-described dispersant of the present invention. In the pigment dispersion, the organic pigment (A) and the above-described dispersant (B) of the present invention may preferably be contained at a ratio of from 1 to 100 parts by weight of B per 100 parts by weight of A.

The present invention further provides a color coating formulation for a color filter, said formulation comprising a resin varnish for the color filter and an organic pigment dispersed with a dispersant in the varnish, wherein the dispersant is the above-described dispersant of the present invention.

The coating formulation may preferably comprise, as the organic pigment, at least one organic pigment selected from blue, violet, green and black pigments; or as the organic pigment, PB15:6 and PV23.

The present invention still further provides a process for fabricating a color filter by forming color patterns of red color, green color and blue color, wherein at least the blue pattern is formed using the above-described coating formulation of the present invention; and also a color filter characterized by being formed by the process.

The present invention yet further provides a coupler characterized by being represented by the following formula (3) or (4):

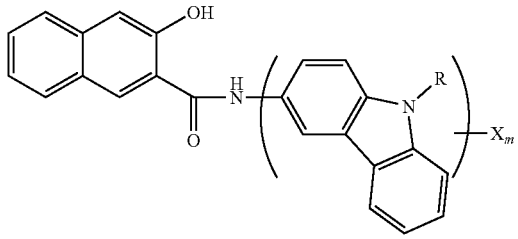

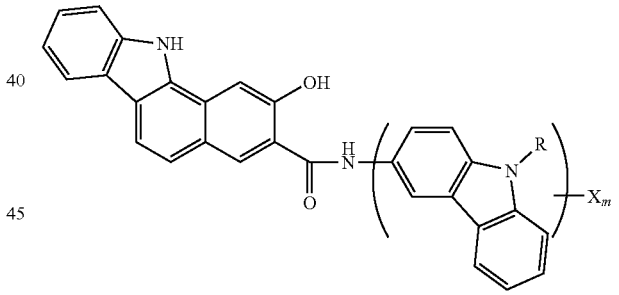

wherein substituents X may be the same or different and each represent a halogen atom, hydroxyl group, nitro group, alkyl group, alkoxyl group, or substituted or unsubstituted phthalimidomethyl group, R represents a hydrogen atom or a $C_1$-$C_{12}$ alkyl group, and m and n are an integer of from 0 to 3. Preferably, m may be 0, and R may be a hydrogen atom or a $C_1$-$C_4$ alkyl group.

Advantageous Effects of the Invention

The organic-pigment dispersant of the present invention can stably disperse various organic pigments at high concentration and with low viscosity in dispersion media for paints, printing inks, coating formulations for color filters, and the like. The pigment composition and dispersion of the present invention are useful as colorants for coating formulations for color filters and, when PB15:6 and PV23 are combined as a pigment, can form blue pixels which have excellent spectral transmittance characteristics, are vivid, bright and highly-transparent, and moreover, are excellent in various fastness such as light fastness, heat resistance, solvent resistance, chemical resistance and waterproofness. Further, the coupler of the present invention is useful as a raw material for the dispersant of the present invention, and is also useful as a raw material for various azo pigments.

BEST MODES FOR CARRYING OUT THE INVENTION

Figure 1:
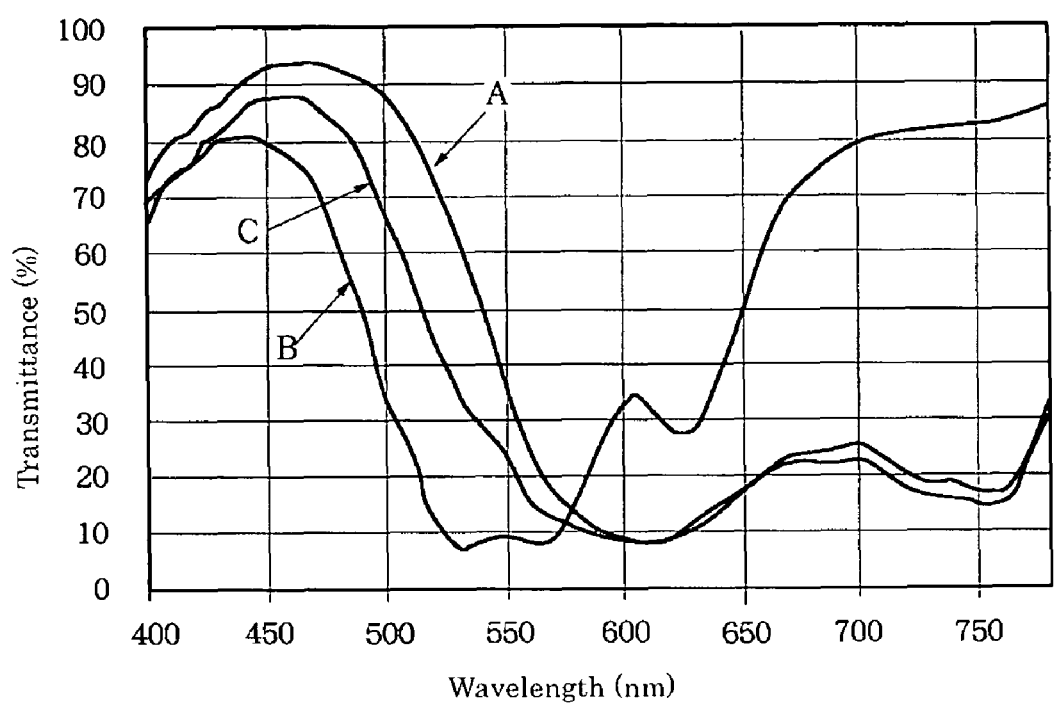
FIG. 1: A diagram illustrating spectral transmittance characteristics of color coating films.

The present invention will next be described in detail based on preferred embodiments.

[Dispersant]

The organic-pigment dispersant of the present invention is characterized by comprising the compound represented by the formula (1) or (2). In the formula (1) or (2), m and n may preferably be 0, R may preferably be a hydrogen atom or a $C_1$-$C_4$ alkyl group.

To obtain the compound represented by the formula (1) or (2), a base component having 1 to 3 sulfonic groups, preferably one sulfonic group ($R_D$—$NH_2$) is firstly diazotized, and is then subjected to a coupling reaction with a novel coupler represented by the following formula (3) or (4) to synthesize an azo pigment represented by the following formula (5) or (6).

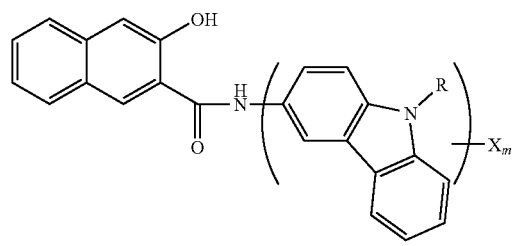
(3)

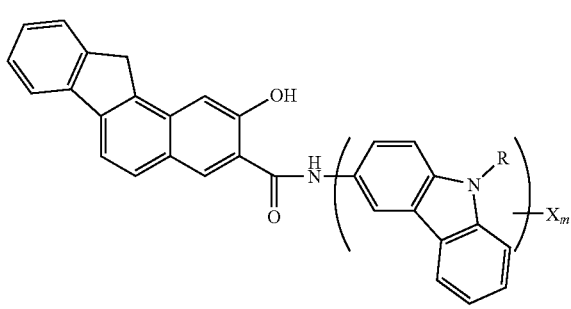
(4)

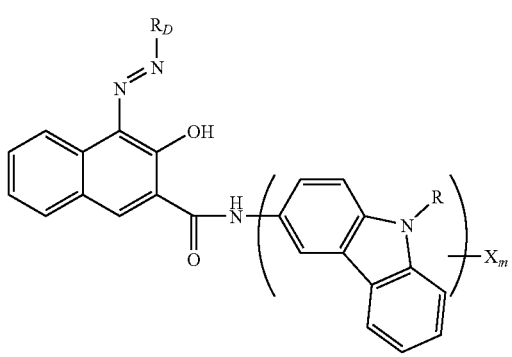
(5)

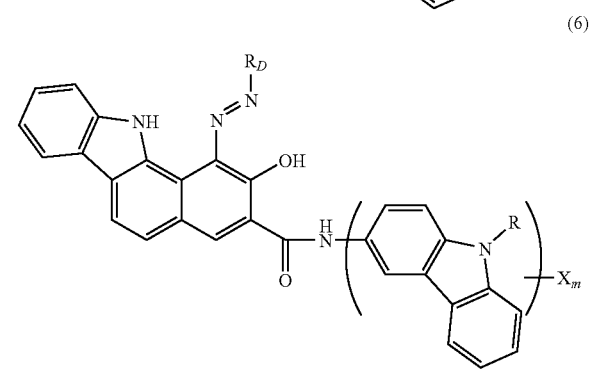
(6)

wherein $R_D$, R, X and m have the same meanings as defined above.

By further subjecting the azo pigment represented by the formula (5) or (6) to a substitution reaction to introduce the substituent or substituents Y as needed, the azo pigment can be converted into the organic-pigment dispersant comprised of the compound represented by the formula (1) or (2). It is to be noted that the substituent or substituents Y and its (their) number n have the same meaning as defined above.

No particular limitation is imposed on the base component ($R_D$—$NH_2$) which has the sulfonic group or groups and is useful in the foregoing, insofar as it permits the diazotization and coupling reaction. Usable examples include sulfanilic acid (p-aminobenzenesulfonic acid), 2-methylaniline-4-sulfonic acid, metanilic acid (m-aminobenzenesulfonic acid), 4-chloroaniline-3-sulfonic acid, orthanilic acid (o-aminobenzenesulfonic acid), C acid, 2B acid, 2-toluidino-4-sulfonic acid, 4-toluidino-2-sulfonic acid, o-chlorometanilic acid, o-anisidine-p-sulfonic acid, aniline-2,5-disulfonic acid, naphthionic acid, Lorenz acid, Brenner acid, 1,6-Cleve's acid, 1,7-Cleve's acid, Peri acid, Tobias acid, 2-naphthylamine-7-sulfonic acid, Dahl's acid, S acid, M acid, gamma acid, J acid, H acid, SS acid, RR acid, R acid, K acid, 2R acid, amino G acid, amino J acid, 1-aminoanthraquinone-5-sulfonic acid, 1-aminoanthraquinone-8-sulfonic acid, 1-aminoanthraquinone-2-sulfonic acid, 3-(4-amino-5-methoxy-2-methylphenylcarbamoyl)benzenesulfonic acid, 3-(4-amino-2,5-dimethoxyphenylcarbamoyl)benzene-sulfonic acid, 3-(4-amino-2,5-diethoxyphenyl-carbamoyl)benzenesulfonic acid, and the like. Among the above-described base components having sulfonic group or groups, particularly preferred are those employed in Examples to be described subsequently herein.

The novel couplers represented by the formula (3) or (4) can each be obtained by a condensation reaction between 2-hydroxy-3-naphthoic acid (BON acid) or benzacylic acid (HBCC acid) and an unsubstituted or X-substituted 3-aminocarbazole or 3-amino-9-alkylcarbazole in an inert solvent such as toluene, xylene or monochlorobenzene while using thionyl chloride or phosphorus trichloride as a condensation agent. As the alkyl group, $C_1$-$C_{12}$ alkyl groups can be mentioned, with methyl, ethyl, propyl and butyl groups being preferred.

The compound represented by the formula (1) or (2) can also be used with its sulfonic group or groups remaining in the free form, and is also useful with its sulfonic group or groups converted into a salt with an alkali metal such as lithium or sodium, a salt with a polyvalent metal such as calcium, barium, aluminum, manganese, strontium, magnesium or nickel, a salt with a primary, secondary or tertiary amine such as a mono-, di- or tri-alkylamine, alkylenediamine, mono-, di- or tri-alkanolamine, or a salt with a quaternary ammonium compound such as a tetraalkylammonium, benzyltrimethylammonium or a trialkylphenylammonium. Particularly useful group or groups are free sulfonic group or groups, or its or their salts with a polyvalent metal (preferably, aluminum) or its or their salts with a quaternary ammonium compound.

The organic-pigment dispersant of the present invention is useful as a dispersant for various known organic pigments. The dispersant of the present invention is a substance colored reddish violet-to-violet-to-blue. As organic pigments for the dispersion of which the dispersant of the present invention is particularly useful, PV23, PB60, PB15:6, PG7, PG36 and PBk7 can be mentioned. It is to be noted that in the present invention, carbon black is also supposed to be included as an organic pigment.

[Pigment Composition]

The pigment composition of the present invention comprises an organic pigment and the dispersant of the present invention. As the mixing ratio of the organic pigment to the dispersant of the present invention in the pigment composition, it is preferred to use the dispersant at a ratio of from approx. 1 to 100 parts by weight, notably from 1 to 30 parts by weight per 100 parts by weight of the organic pigment. Use of the dispersant at a ratio of smaller than 1 parts by weight may encounter a difficulty in fully stably dispersing the pigment composition in a dispersion medium, while use of the dispersant at a ratio of greater than 100 parts by weight can bring about no extra dispersing ability from the dispersant and is disadvantageous from the standpoint of cost.

As a production method of the pigment composition, it is necessary to simply mix the organic pigment and the dispersant together. Nonetheless, preferred are, for example, the methods to be described below. In each method, the organic pigment to be used can be a single organic pigment or a mixture of two or more organic pigments. This applies equally to the dispersant.

(1) A method that intimately mixes an aqueous slurry of the organic pigment and an aqueous slurry of the dispersant together, and conducts filtration, water washing and drying to form the organic pigment and dispersant into a composition.

(2) A method that dissolves the organic pigment and dispersant in concentrated sulfuric acid, charges the resultant concentrated sulfuric acid solution into a great deal of water to precipitate both of them at the same time, and conducts filtration, water washing and drying to form the organic pigment and dispersant into a solid-solution form.

(3) A method that subjects both of them to wet milling in the presence of a small amount of liquid by a ball mill or the like to form both of them into a fine powdery mixture.

The pigment composition of the present invention is effective for various coloring applications, for example, for the coloration of paints, printing inks, natural or synthetic resins, writing instrument inks, inkjet inks, and the like, especially for the coloration of coating formulations for color filters. In particular, a pigment composition making use of at least one organic pigment selected from PV23, PB60, PB15:6, PG7, PG36 and PBk7 is useful as a colorant in a coating formulation for color filters.

[Pigment Dispersion]

The pigment dispersion of the present invention is a pigment dispersion comprising a dispersion medium and an organic pigment dispersed with a dispersant in the dispersion medium, and is characterized in that the dispersant is the above-described dispersant of the present invention. Preferred organic pigments are the same as those described above, and the ratio of the organic pigment to the dispersant to be used is also the same as that described above. The pigment dispersion can be obtained by dispersing the organic pigment with the dispersant of the present invention in a desired dispersion medium. The pigment dispersion can be obtained by using, as a dispersion method, a method that adds the pigment composition of the present invention to the dispersion medium and disperses the former in the latter or a method that adds the pigment and the dispersant of the present invention into the desired dispersion medium and disperses the organic pigment by a desired disperser or milling machine. Applications of such a pigment dispersion are similar to those of the pigment composition.

[Coating Formulation for Color Filter]

The coating formulation of the present invention for the color filter is characterized in that an organic pigment is dispersed with the above-described dispersant of the present invention in a resin varnish for the color filter. As the resin varnish for the color filter, any one of conventionally-known photosensitive resin varnishes (photoresists) and nonphotosensitive resin varnishes can be used. Preferred organic pigments usable in the coating formulation, their combinations, and the ratio of the organic pigment to the dispersant to be used are similar to those in the case of the above-described pigment composition of the present invention. Further, a production method of the coating formulation for the color filter is similar to that in the case of the above-described pigment dispersion except that the dispersion medium is the resin varnish for the color filter.

When a blue, green or black pigment is used in the coating formulation for the color filter, a blue coating formulation, green coating formulation or black coating formulation (for the formation of a black matrix) is obtained correspondingly. When PV23 is used as an organic pigment, a violet coating formulation is obtained. The violet coating formulation is not used solely by itself as a coating formulation for a color filter, but is useful for the color matching of a coating formulation making use of $\epsilon$-phthalocyanine blue as a blue pigment. Described specifically, a color coating film formed from a blue coating formulation has spectral transmittance characteristics indicated by the curve A in FIG. 1. As mentioned above in connection with the conventional technologies, however, the characteristics indicated by the curve C in FIG. 1 are required as spectral transmittance characteristics of blue pixels for a color filter employed in a TV monitor at present. The spectral transmittance characteristics A of the color coating film formed from the blue coating formulation, by adding an appropriate amount of the violet coating formulation, the spectral transmittance characteristics of which are indicated by the curve B in FIG. 1, to the blue coating formulation, the spectral transmittance characteristics of a coating film formed from the resulting mixed coating formulation can be shifted close to the characteristics indicated by the curve C in FIG. 1.

In the present invention, a coating formulation for a color filter, said coating formulation being capable of affording a coating film (pixels) having the spectral transmittance characteristics indicated by the curve C in FIG. 1, can be obtained, for example, by concurrently dispersing in the resin varnish the pigment composition which contains PB15:6 and PV23 or by concurrently dispersing both of them with the dispersant of the present invention in the resin varnish. To obtain such spectral transmittance characteristics, PV23 is used at a ratio of from 1 to 100 parts by weight, preferably from 3 to 50 parts by weight per 100 parts by weight of PB15:6.

[Fabrication Process of Color Filter]

The process of the present invention for the fabrication of the color filter is a process for fabricating a color filter by forming color patterns of red color, green color and blue color on a color filter substrate, and is characterized in that at least the blue pattern is formed using the above-described coating formulation of the present invention. Coating formulations other than the blue coating formulation may be separately provided by a conventionally-known method, and as a green coating formulation, the above-described green coating formulation of the present invention may also be used. It is to be noted that the fabrication process itself of the color filter can be any one of conventionally-known processes.

[Coupler]

The novel coupler represented by the formula (3) or (4) can be obtained by a condensation reaction between 2-hydroxy-3-naphthoic acid (BON acid) or benzacylic acid (HBCC acid) and an unsubstituted or X-substituted 3-amino-9-alkyl (or unsubstituted) carbazole in an inert solvent such as toluene, xylene or monochlorobenzene while using thionyl chloride, phosphorus trichloride or the like as a condensation agent. Specific production examples will be described in Examples. As the alkyl group, $C_1$-$C_{12}$ alkyl groups can be mentioned, with methyl, ethyl, propyl and butyl groups being preferred.

Various azo dyes and azo pigments can be obtained by subjecting the coupler to coupling reactions with the diazonium salts of various aromatic amines. A particularly preferred application of the coupler is as a raw material for organic-pigment dispersants.

EXAMPLES

The present invention will next be more specifically described based on Examples and Comparative Examples. It is to be noted that all designations of "parts" and "%" in the Examples and Comparative Examples are on a weight basis unless otherwise specifically indicated.

Examples of the Coupler

Example K-1

Figure 2:
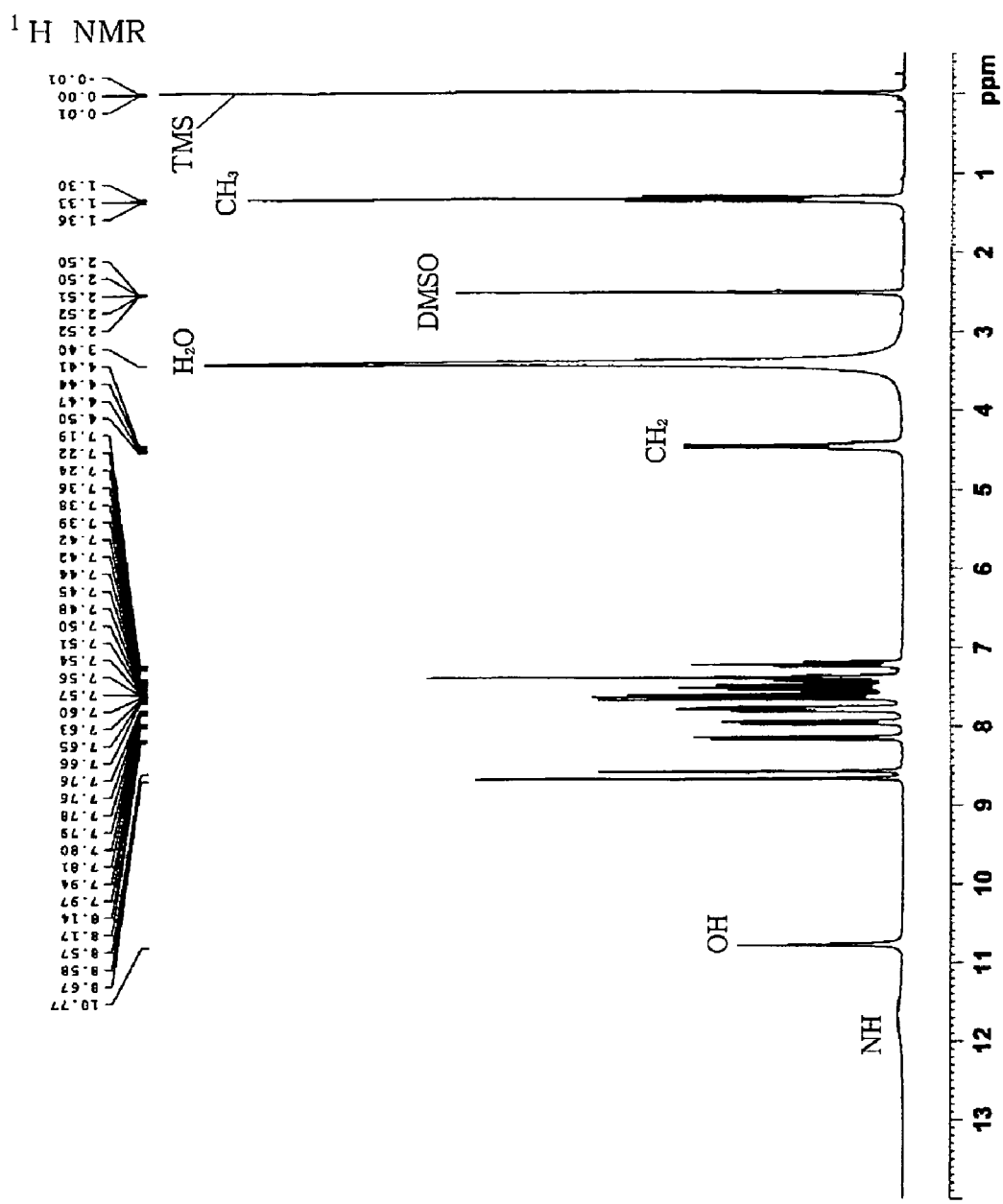
FIG. 2: A $^1$H-NMR spectrum of the coupler K-1.
Figure 4:
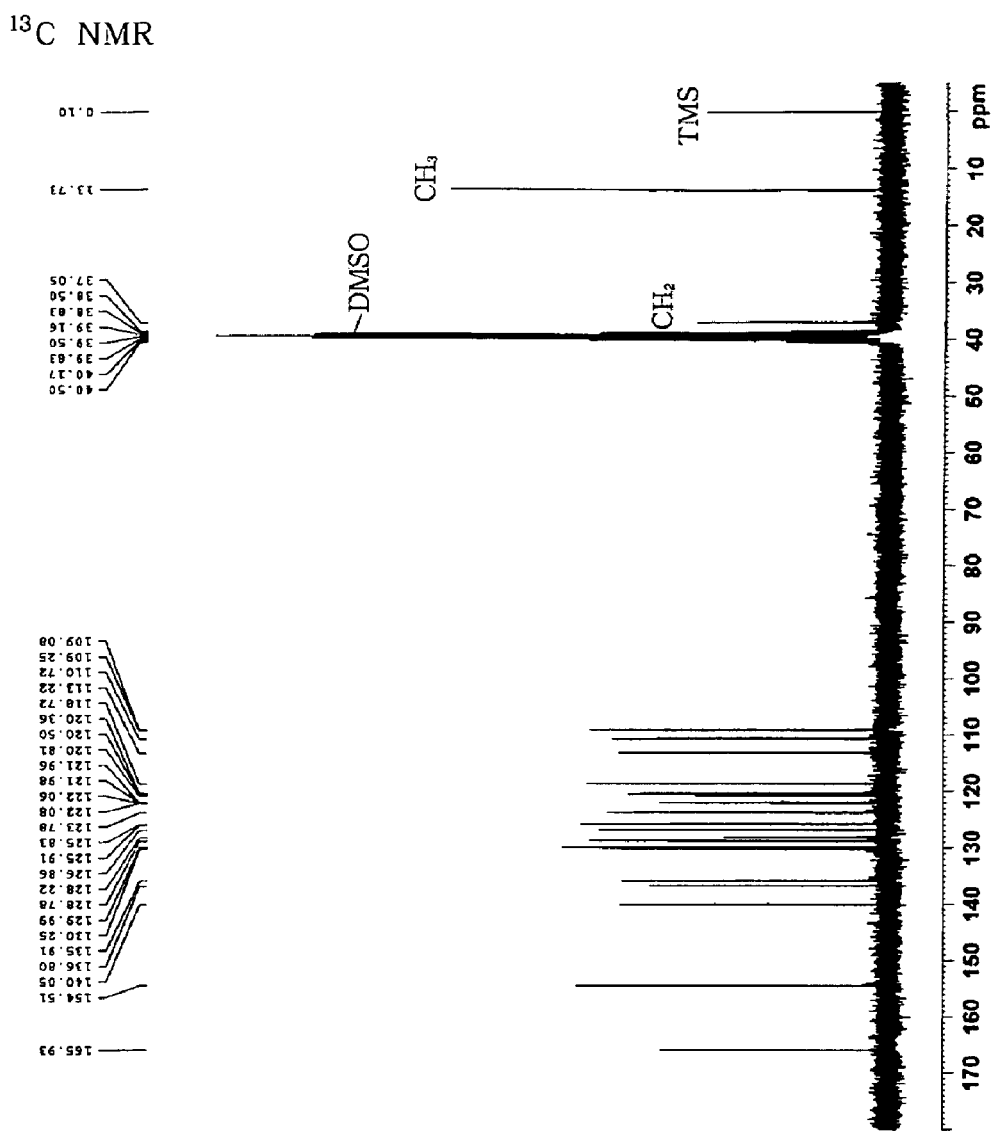
FIG. 4: A $^{13}$C-NMR spectrum of the coupler K-1.
Figure 6:
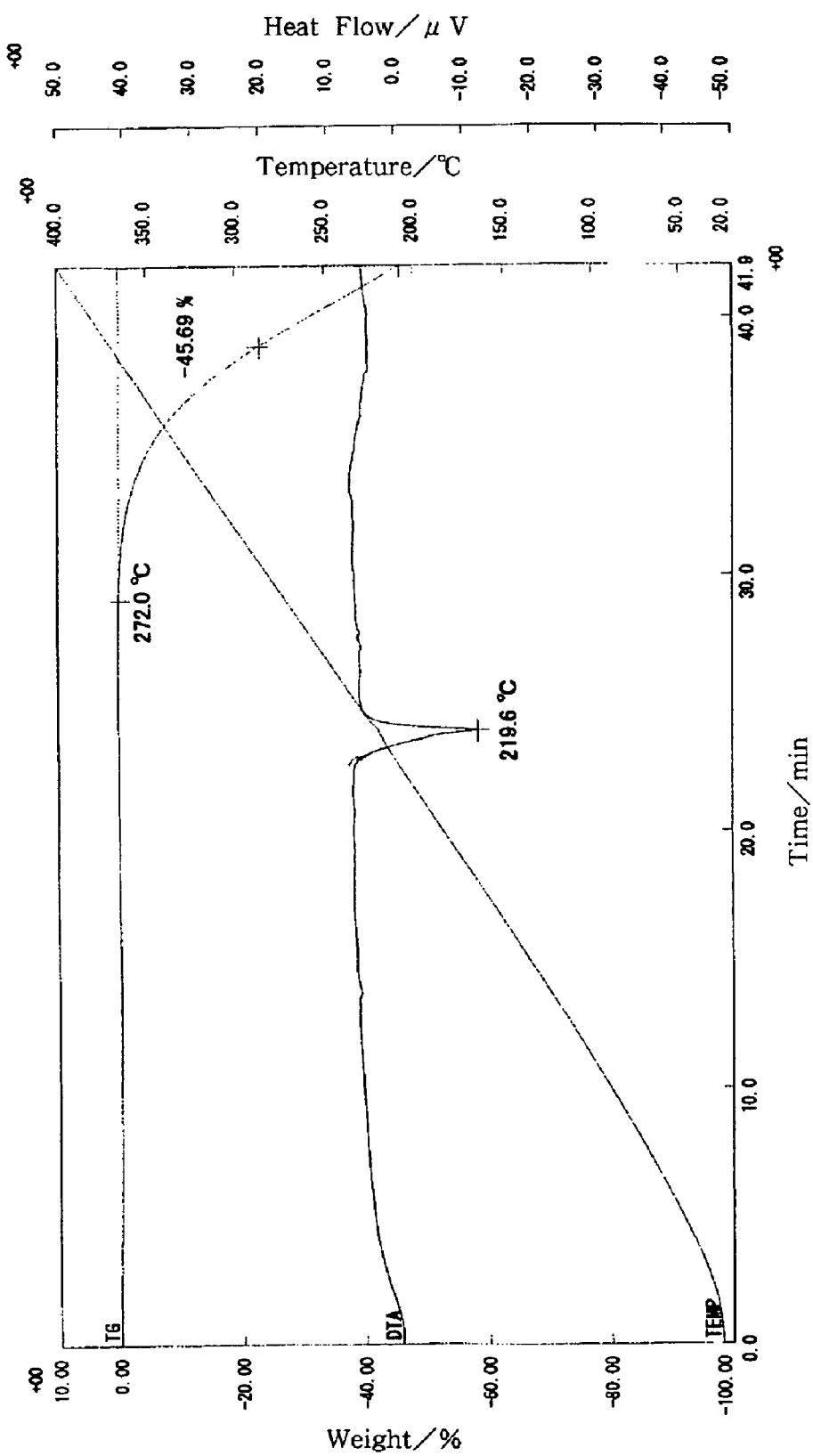
FIG. 6: A thermal analysis chart of the coupler K-1.
Figure 8:
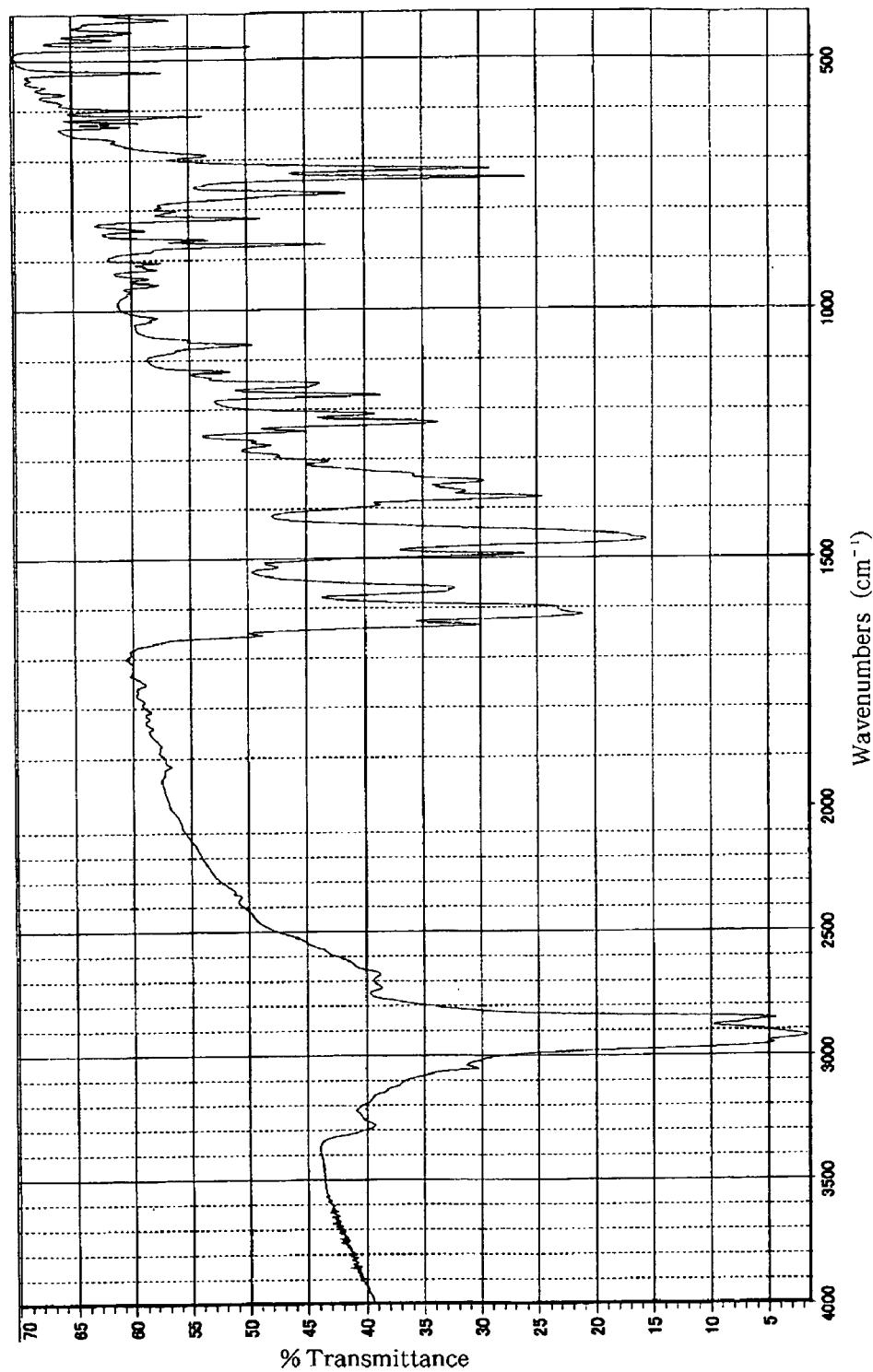
FIG. 8: An infrared absorption spectrum of the coupler K-1 (the nujol method).

After phosphorus trichloride (13.2 parts) was added at 70 to 75° C. over 1 hour to toluene (700 parts), 2-hydroxy-3-naphthoic acid (40 parts) and 3-amino-9-ethylcarbazole (44.8 parts), the resulting mixture was stirred at the same temperature for 1 hour and then at 107 to 110° C. for 20 hours. The solvent was eliminated by steam distillation under alkaline conditions. The residue was filtered at 50 to 60° C., and the solid was dried to obtain a coupler represented by the below-described structural formula (75.0 parts). The coupler is a new substance, and the results of its elemental analysis were: C, 78.81% (calculated: 78.93%), H: 5.30% (calculated: 5.30%), N, 7.38% (calculated: 7.36%). A $^1$H-NMR spectrum of the compound is shown in FIG. 2, its $^{13}$C-NMR spectrum is shown in FIG. 4, its thermal analysis chart is presented in FIG. 6, and its infrared absorption spectrum is presented in FIG. 8.

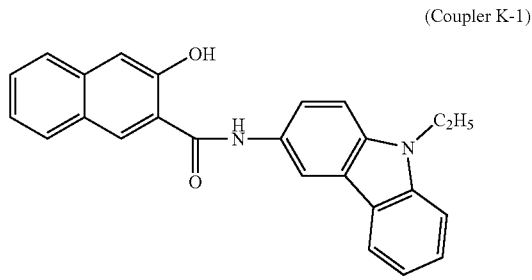

(Coupler K-1)

Example K-2

Figure 3:
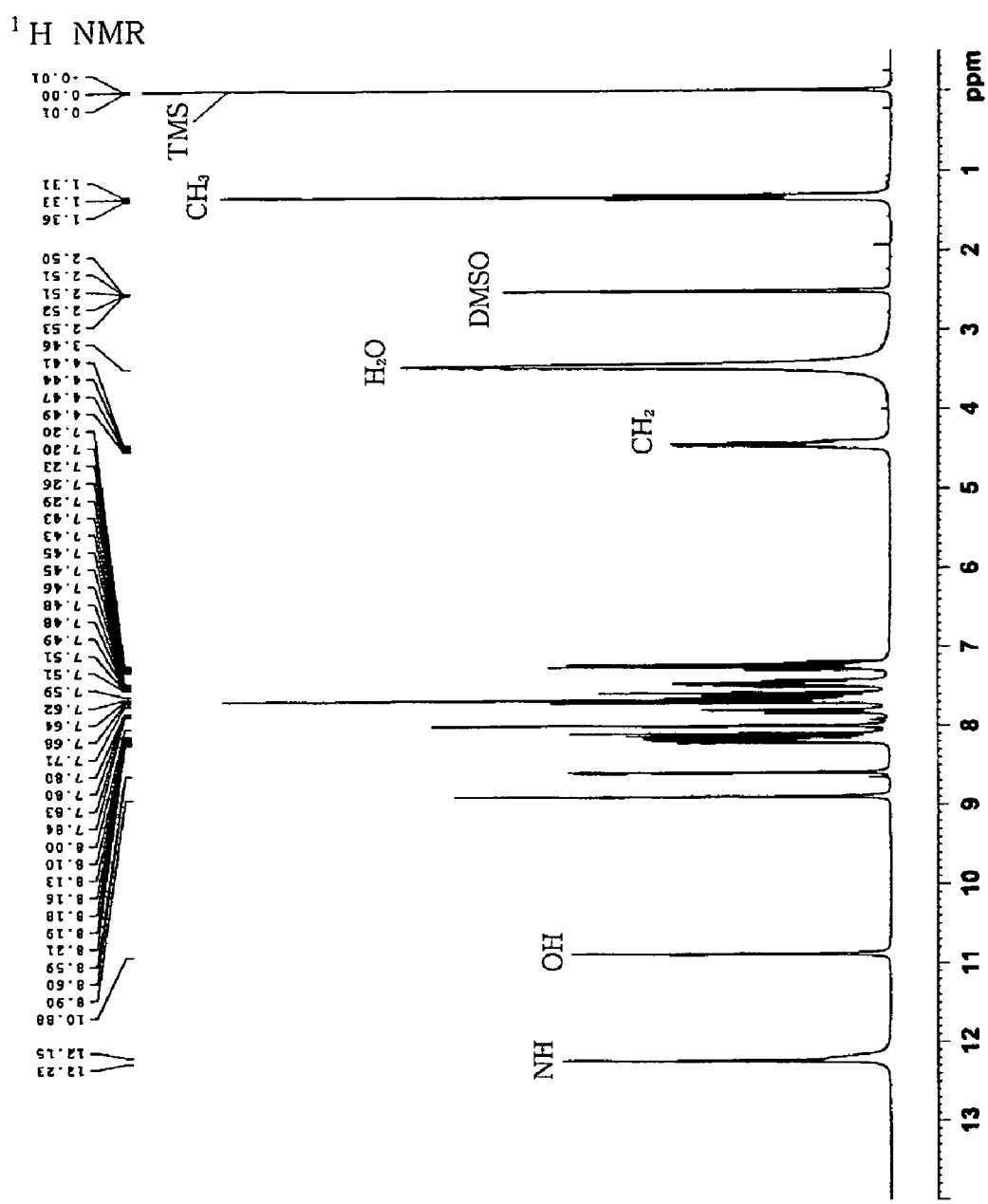
FIG. 3: A $^1$H-NMR spectrum of the coupler K-2.
Figure 5:
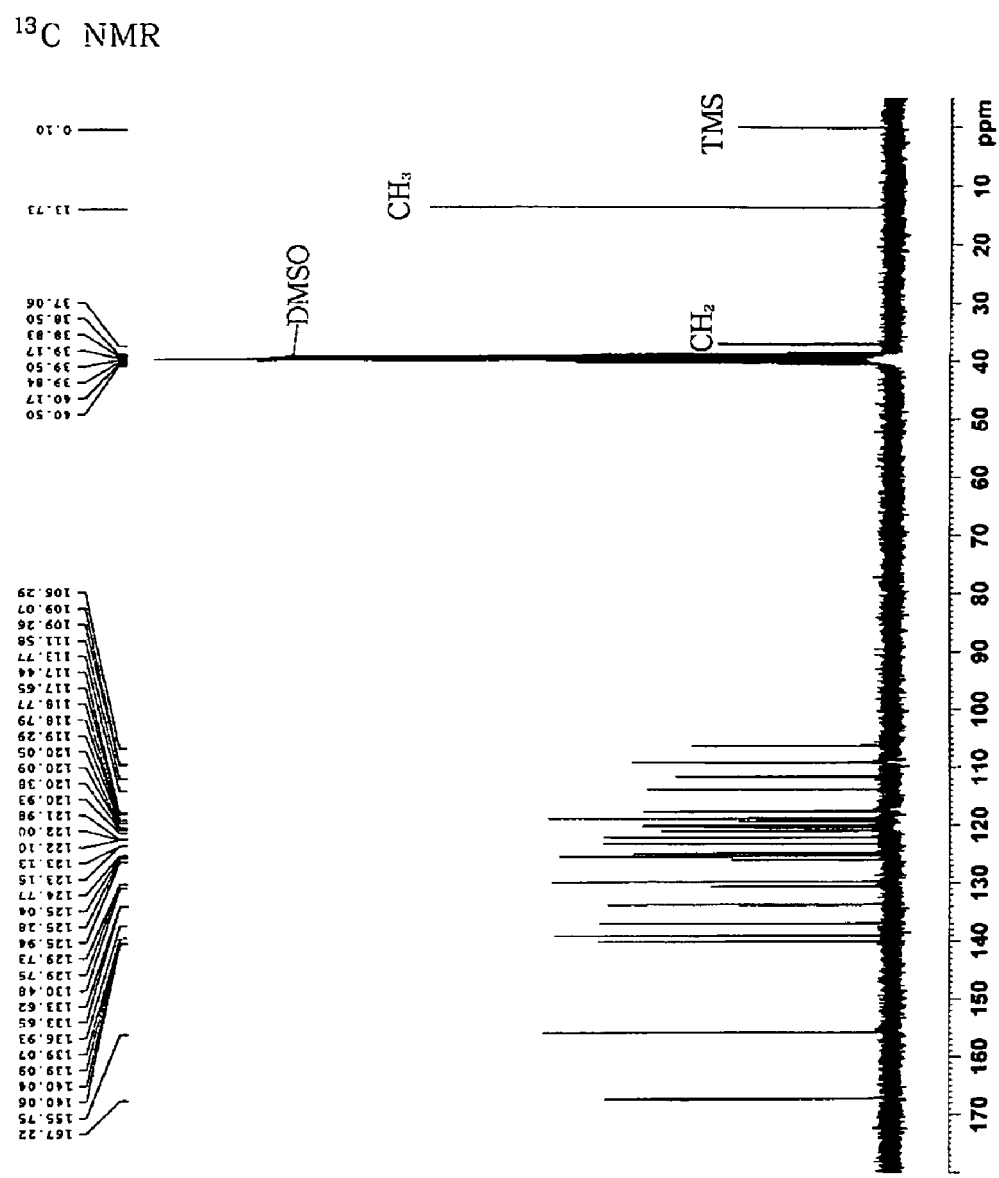
FIG. 5: A $^{13}$C-NMR spectrum of the coupler K-2.
Figure 7:
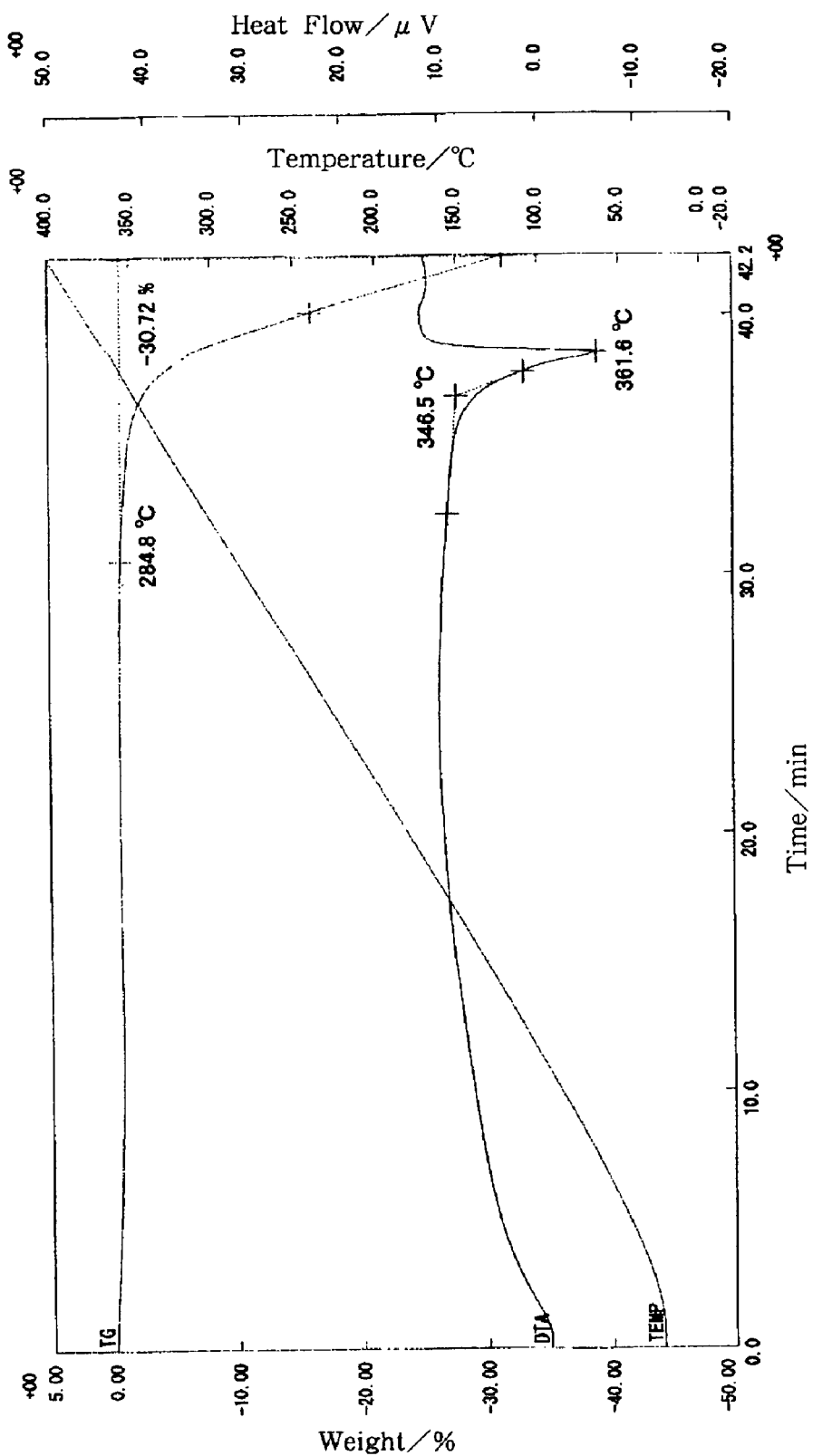
FIG. 7: A thermal analysis chart of the coupler K-2.
Figure 9:
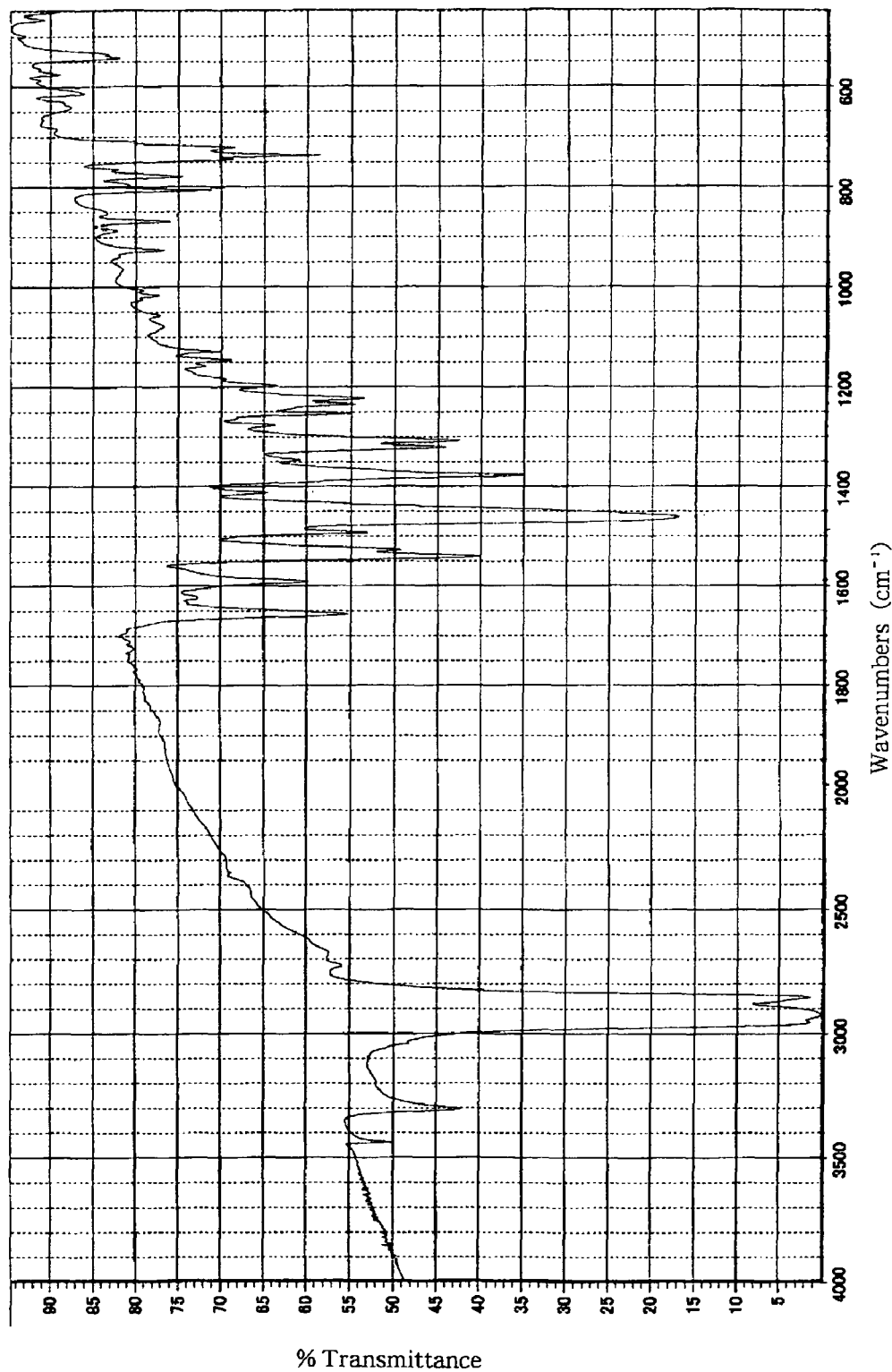
FIG. 9: An infrared absorption spectrum of the coupler K-2 (the nujol method).

After phosphorus trichloride (3.2 parts) was added at 90 to 95° C. over 1 hour to monochlorobenzene (150 parts), sodium benzacylate (14.2 parts) and 3-amino-9-ethylcarbazole (10.0 parts), the resulting mixture was stirred at the same temperature for 1 hour and then at 128 to 130° C. for 25 hours. The solvent was eliminated by steam distillation under alkaline conditions. The residue was filtered at 50 to 60° C., and the solid was dried to obtain a coupler represented by the below-described structural formula (21.2 parts). The coupler is a new substance, and the results of its elemental analysis were: C, 79.50% (calculated: 79.30%), H: 4.95% (calculated: 4.94%), N, 8.96% (calculated: 8.95%). A $^1$H-NMR spectrum of the compound is shown in FIG. 3, its $^{13}$C-NMR spectrum is shown in FIG. 5, its thermal analysis chart is presented in FIG. 7, and its infrared absorption spectrum is presented in FIG. 9.

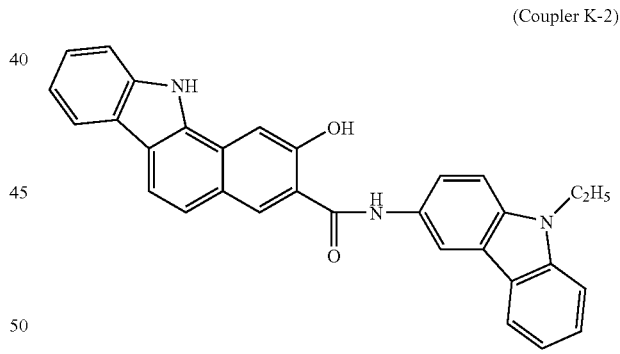

(Coupler K-2)

Examples of the Dispersant

Example 1

Sulfanilic acid (12.7 parts) was dissolved in sodium carbonate (4.5 parts) and water (120 parts). Concentrated hydrochloric acid (23.8 parts) was added, followed by chilling to 20° C. Further, ice was added to chill down to 5° C. Sodium nitrite (5.5 parts) was added as a 20% aqueous solution at not higher than 10° C., followed by stirring for 0.5 hour. Excess nitrous acid was decomposed with an aqueous solution of sulfamic acid to prepare a diazo solution. On the side, the coupler K-1 (Example K-1) (28.0 parts) was dissolved in sodium hydroxide (4.4 parts), sodium acetate trihydrate (8.4 parts) and methanol (500 parts). After the diazo solution was added dropwise to the resulting mixture at not higher than 10° C., the thus-obtained mixture was stirred for approx. 3 hours while controlling its pH at 8.5 with sodium acetate trihydrate. Subsequent to determination of the reaction end point, the reaction product was collected by filtration, washed with methanol and water, and then reslurried in water. Hydrochloric acid was added to the resultant slurry to render it strongly acidic, followed by filtration, water-washing and drying to obtain a reddish violet dispersant (1) represented by the following structural formula (37.6 parts).

Dispersant (1)

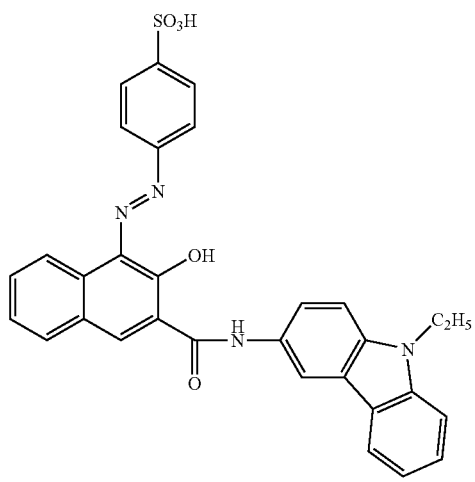

Example 2

A water paste (48.9 parts, solid content: 15.0 parts) of the dispersant (1) obtained in Example 1 was added to water (500 parts) and was fully reslurried. Tetraethylammonium chloride (9.5 parts) was added. After stirring for 3 hours, the resulting mixture was filtered, and the solid was thoroughly washed with water to obtain a reddish violet dispersant (2) represented by the following structural formula (17.6 parts).

Dispersant (2)

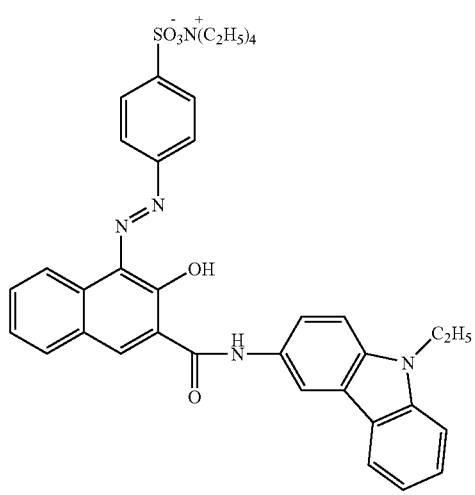

Example 3

A water paste (48.9 parts, solid content: 15.0 parts) of the dispersant (1) obtained in Example 1 was added to water (500 parts) and was fully reslurried. A 10% aqueous solution (200 parts) of aluminum sulfate tetradeca-to-octadeca-hydrate was added. After stirring at 85 to 95° C. for 2 hours, the resulting mixture was filtered, and the solid was thoroughly washed with water to obtain a reddish violet dispersant (3) represented by the following structural formula (14.8 parts).

Dispersant (3)

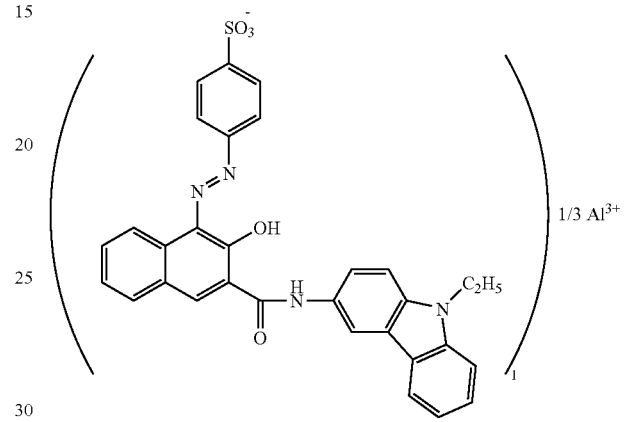

Example 4

A reddish violet dispersant (4) represented by the following structural formula was obtained in a similar manner as in Example 1 except for the use of naphthionic acid in place of sulfanilic acid.

Dispersant (4)

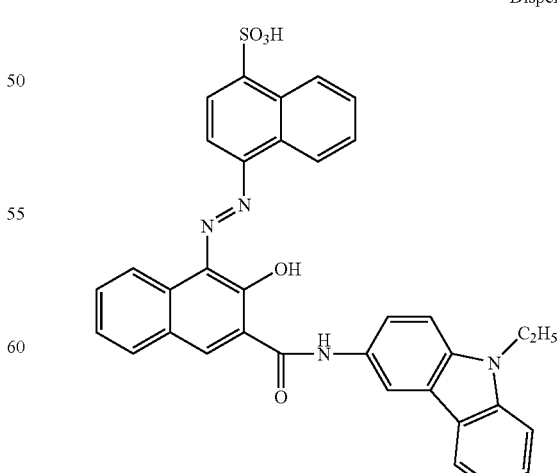

Example 5

A reddish violet dispersant (5) represented by the following structural formula was obtained by reacting the dispersant (4) and tetraethylammonium chloride in a similar manner as in Example 2.

Dispersant (5)

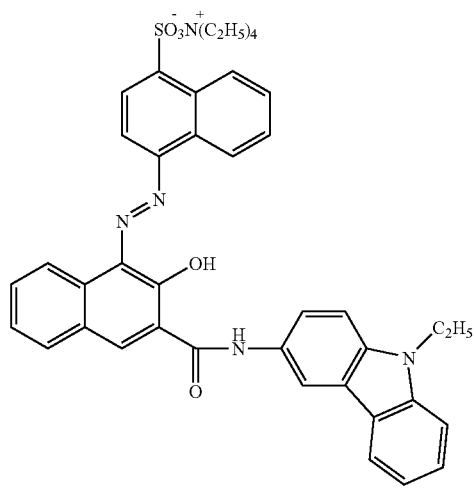

Example 6

A reddish violet dispersant (6) represented by the following structural formula was obtained by reacting the dispersant (4) and aluminum sulfate tetradeca-to-octadeca-hydrate in a similar manner as in Example 3.

Dispersant (6)

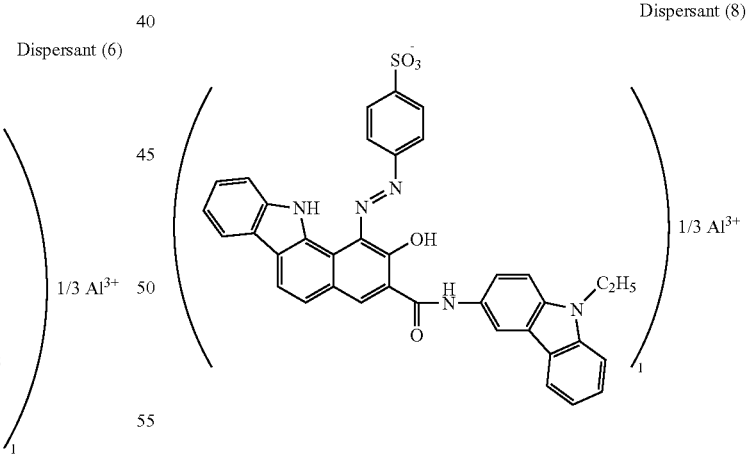

Example 7

In a similar manner as in Example 1, a violet dispersant (7) represented by the following structural formula was obtained by using sulfanilic acid as a diazo component and the above-described K-2 as a coupler.

Dispersant (7)

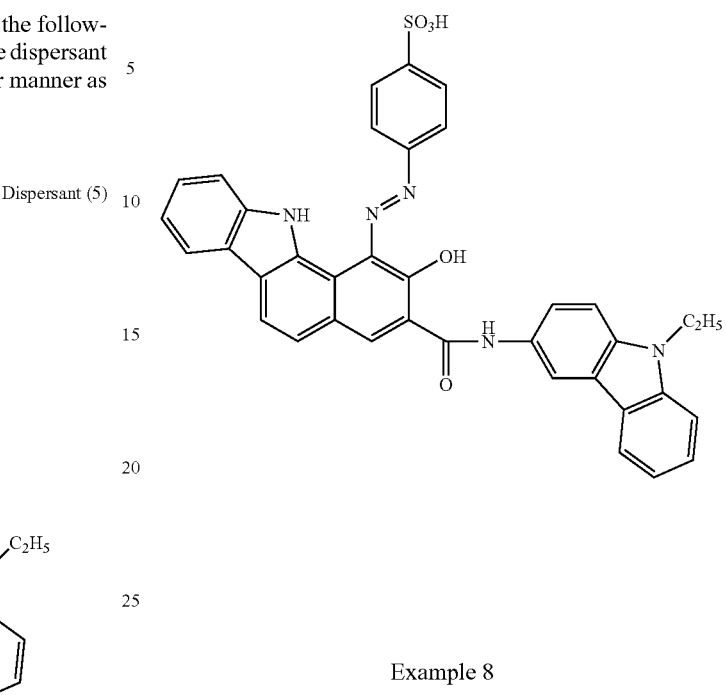

Example 8

A reddish violet dispersant (8) represented by the following structural formula was obtained by reacting the dispersant (7) and aluminum sulfate tetradeca-to-octadeca-hydrate in a similar manner as in Example 3.

Dispersant (8)

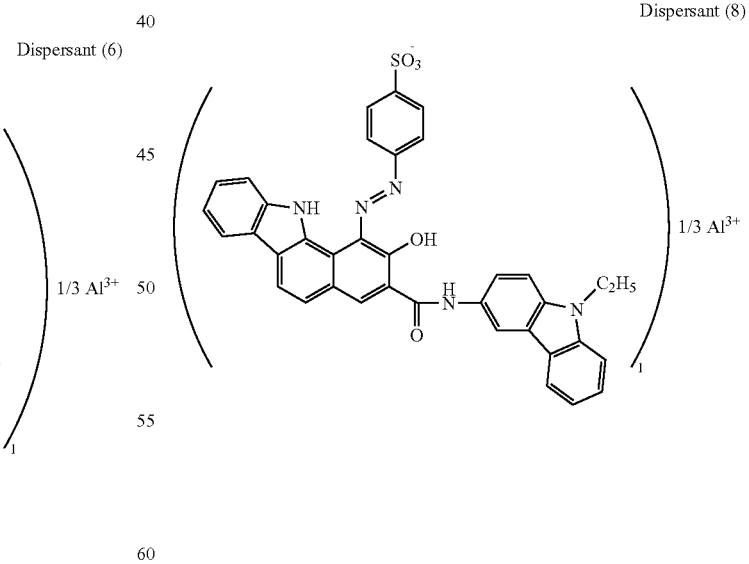

Example 9

In a similar manner as in Example 1, a violet dispersant (9) represented by the following structural formula was obtained by using naphthionic acid as a diazo component and the above-described K-2 as a coupler.

Dispersant (9)

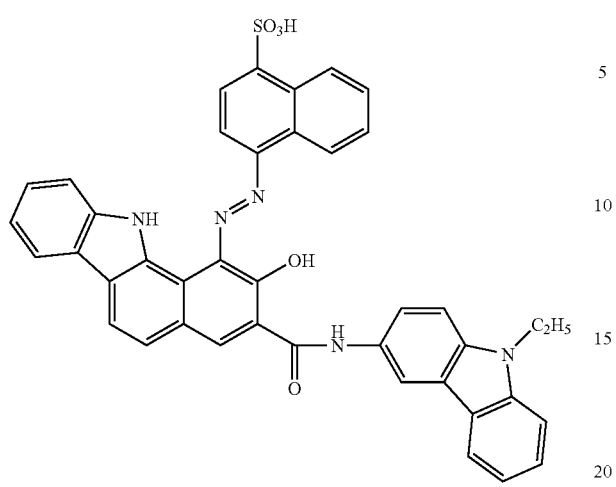

Example 10

In a similar manner as in Example 1, a reddish violet dispersant (10) represented by the following structural formula was obtained by using Brenner acid as a diazo component and the above-described K-1 as a coupler.

Dispersant (10)

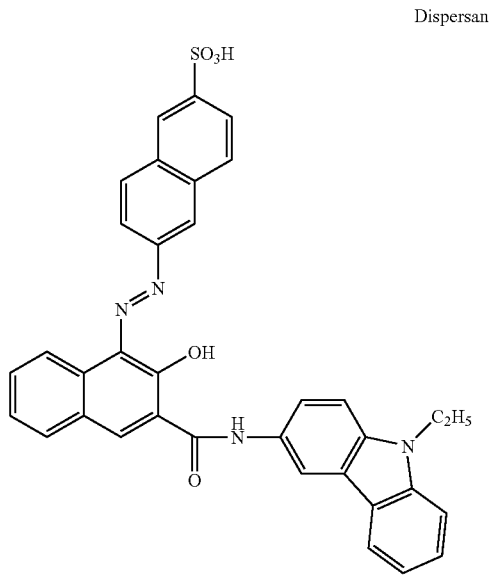

Example 11

In a similar manner as in Example 1, a violet dispersant (11) represented by the following structural formula was obtained by using M acid as a diazo component and the above-described K-1 as a coupler.

Dispersant (11)

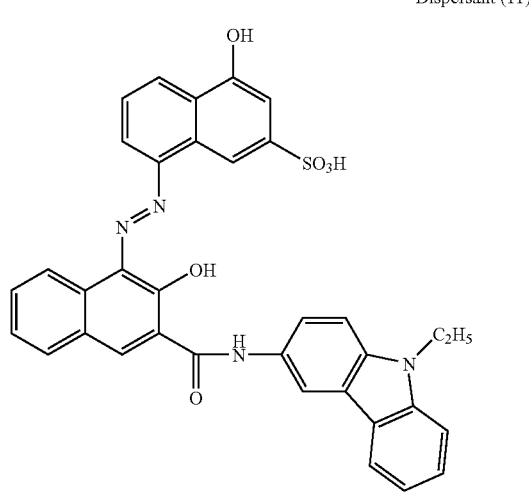

Example 12

In a similar manner as in Example 1, a violet dispersant (12) represented by the following structural formula was obtained by using gamma acid as a diazo component and the above-described K-1 as a coupler.

Dispersant (12)

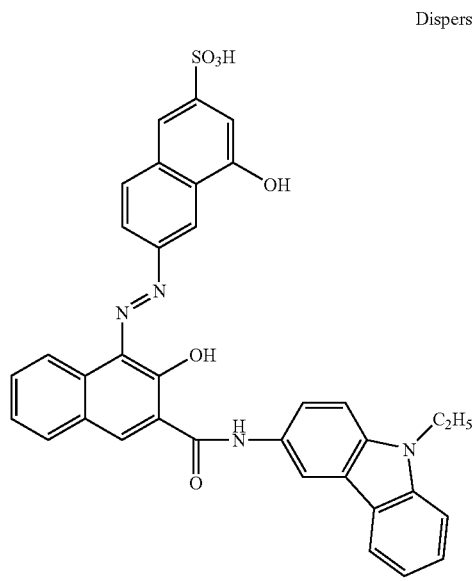

Example 13

In a similar manner as in Example 1, a violet dispersant (13) represented by the following structural formula was obtained by using 3-(4-amino-5-methoxy-2-methylphenyl-carbamoyl)benzenesulfonic acid as a diazo component and the above-described K-1 as a coupler.

Dispersant (13)

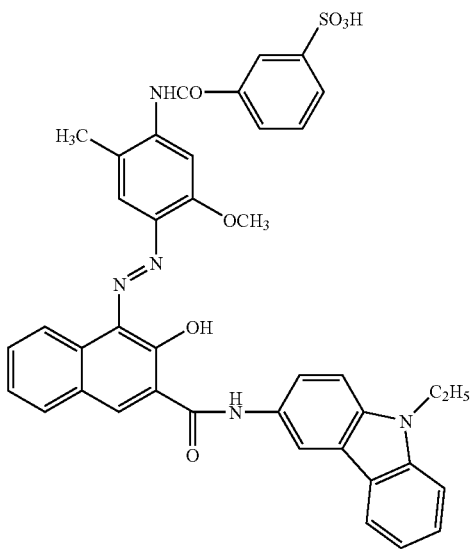

Example 14

In a similar manner as in Example 1, a reddish violet dispersant (14) represented by the following structural formula was obtained by using 1-aminoanthraquinone-5-sulfonic acid as a diazo component and the above-described K-1 as a coupler.

Dispersant (14)

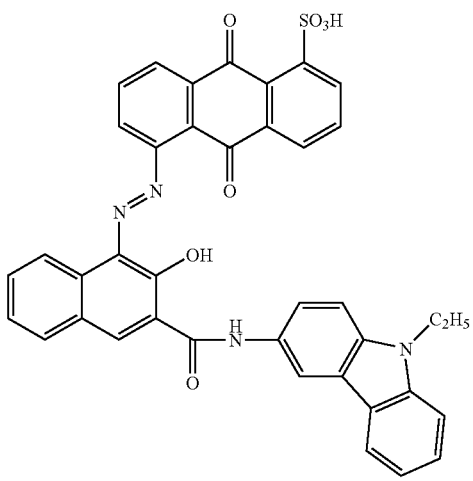

Examples of the Pigment Composition

Example B-1

A press cake (solid content: 26%) of PV23 was weighed to give a pigment content of 100 parts. Water (2,000 parts) was added, followed by thorough reslurrying. To the resulting slurry, a press cake (solid content: 30%) of the dispersant (1) was added to give a solid content of 5 parts, and the resultant mixture was stirred at high speed for 1 hour. A 5% aqueous solution of sodium carbonate was gradually added dropwise until the mixture became weakly acidic. Subsequently, filtration was conducted, and the solid was thoroughly washed with water and then dried at 80° C. to obtain a pigment composition (1) (104 parts).

Example B-2

A press cake (solid content: 26%) of PV23 was weighed to give a pigment content of 100 parts. Water (2,000 parts) was added, followed by thorough reslurrying. To the resulting slurry, a press cake (solid content: 35%) of the dispersant (2) was added to give a solid content of 5 parts, and the resultant mixture was stirred at high speed for 1 hour. Subsequently, stirring was conducted for 1 hour, followed by filtration. The solid was thoroughly washed with water and then dried at 80° C. to obtain a pigment composition (2) (104 parts).

Example B-3

A composition (3) was obtained in a similar manner as in Example B-2 except for the use of the dispersant (3) in place of the dispersant (2).

Examples of the Pigment Dispersion

Example C-1

To an acrylic resin varnish (which had been obtained by copolymerizing methacrylic acid, benzyl acrylate, styrene and hydroxyethyl acrylate at a molar ratio of 25/50/15/10 (molecular weight: 12,000, solid content: 40%) (50 parts), PV23 (20 parts), the dispersant (1) (1 parts) and a solvent (propylene glycol 1-monomethyl ether 2-acetate) (hereinafter abbreviated as "PGMAc") (20 parts) were added. Subsequent to premixing, dispersion processing was conducted in a horizontal bead mill to obtain a violet pigment dispersion.

Example C-2

A violet pigment dispersion was obtained in a similar manner as in Example C-1 except for the use of the dispersant (2) in place of the dispersant (1).

Examples C-3 to C-14

Violet pigment dispersions were obtained in a similar manner as in Example C-1 except that the dispersants (3) to (14) were used, respectively, in place of the dispersant (1).

Examples C-15, C-16 & C-17

Three violet pigment dispersions were obtained in a similar manner as in Example C-1 except that the pigment compositions (1), (2) and (3) were used, respectively, in place of PV23 and the dispersant (1).

Comparative Example C-1

A violet pigment dispersion was obtained in a similar manner as in Example C-1 except for the use of a commercial pigment dispersant (monosulfonated phthalocyanine blue) in place of the dispersant (1).

Comparative Example C-2

A violet pigment dispersion was obtained in a similar manner as in Example C-1 except for the use of a commercial pigment dispersant (the quaternary ammonium salt of monosulfonated phthalocyanine blue) in place of the dispersant (1).

The average particle sizes of the pigments in the violet pigment dispersions of Examples C-1 to C-17, Comparative Example C-1 and Comparative Example C-2 were measured. To observe the storage stability of the violet pigment dispersions, they were stored at room temperature for one month to determine changes in viscosity. Using an E-type viscometer, each viscosity was measured at a rotor speed of 6 rpm. Further, to investigate the spectral transmittance characteristics of the violet pigment dispersions, they were coated on glass substrates by a spinner. Subsequent to drying, the maximum transmittance of each resulting coating film was measured at 440 nm wavelength. The results are shown in Table 1.

As is evident from Table 1, it is clear that, when the violet pigment dispersions of Examples C-1 to C-17 are compared with the violet pigment dispersions of Comparative Examples C-1 and C-2, the coating films formed from the violet pigment dispersions of the respective Examples were higher in maximum light transmittance and the violet pigment dispersions of the respective Examples were lower in both initial viscosity and viscosity after storage (one month later).

Example D-1

By a similar operation as in Example C-1, a blue pigment dispersion was obtained by using PB15:6 in place of PV23. As is shown in FIG. 2, this blue pigment dispersion was also low in both initial viscosity and viscosity after storage (one month later), and also had excellent properties as a pigment dispersion for a coating formulation for color filters.

Example D-2

By a similar operation as in Example C-1, a green pigment dispersion was obtained by using PG36 in place of PV23. As is shown in FIG. 2, this green pigment dispersion was also low in both initial viscosity and viscosity after storage (one month later), and also had excellent properties as a pigment dispersion for a coating formulation for color filters.

Example D-3

By a similar operation as in Example C-1, a black pigment dispersion was obtained by using PBk7 in place of PV23. As is shown in FIG. 2, this black pigment dispersion was also low in both initial viscosity and viscosity after storage (one month later), and also had excellent properties as a pigment dispersion for a coating formulation for color filters (black matrices).

TABLE 1

| Pigment dispersion | Transmittance (%) | Viscosity (mPa·s) Initial | Viscosity (mPa·s) one month later | Average particle size (nm) |
|---|---|---|---|---|
| Example C-1 | 59.5 | 7.0 | 7.5 | 84.1 |
| Example C-2 | 58.9 | 8.1 | 8.4 | 89.3 |
| Example C-3 | 59.8 | 7.6 | 7.2 | 87.7 |
| Example C-4 | 57.9 | 8.3 | 9.0 | 91.3 |
| Example C-5 | 58.8 | 7.6 | 8.2 | 88.8 |
| Example C-6 | 57.0 | 9.0 | 9.9 | 92.4 |
| Example C-7 | 59.1 | 7.3 | 7.3 | 89.6 |
| Example C-8 | 56.8 | 9.1 | 9.7 | 90.1 |
| Example C-9 | 56.2 | 7.9 | 8.9 | 91.5 |
| Example C-10 | 55.5 | 8.9 | 10.5 | 99.7 |
| Example C-11 | 56.1 | 9.5 | 11.0 | 92.0 |
| Example C-12 | 58.6 | 8.0 | 8.9 | 90.0 |
| Example C-13 | 57.0 | 9.3 | 10.6 | 100.1 |
| Example C-14 | 58.5 | 8.2 | 8.8 | 95.0 |
| Example C-15 | 59.7 | 6.9 | 7.5 | 83.1 |
| Example C-16 | 58.9 | 8.1 | 8.4 | 88.3 |
| Example C-17 | 59.9 | 7.3 | 7.4 | 86.7 |
| Comp. Ex. C-1 | 39.0 | 45.0 | 120.5 | 207.2 |
| Comp. Ex. C-2 | 42.4 | 10.9 | 98.0 | 164.5 |

TABLE 2

| Pigment dispersion | Maximum transmittance (380-780 nm) (%) | Viscosity (mPa·s) Initial | Viscosity (mPa·s) one month later | Average particle size (nm) |
|---|---|---|---|---|
| Example D-1 | 86.3 | 11.3 | 12.4 | 66.6 |
| Example D-2 | 87.6 | 13.0 | 13.7 | 64.0 |
| Example D-3 | 0.1 | 12.2 | 14.0 | 105.4 |

Referential Example 1

To the acrylic resin varnish (50 parts) used in Example C-1, an anthraquinonyl red pigment (C.I. Pigment Red 177) (17 parts), an isoindolinone yellow pigment (C.I. Pigment Yellow 139) (3 parts), 2,4-bis[anthraquinonyl(–1')-amino]-6-(N,N-dimethylamino)ethylamino-s-triazine (2 parts) as a pigment dispersant, and PGMAc (20 parts) were added. Subsequent to premixing, dispersion was conducted in a horizontal bead mill to obtain a red pigment dispersion.

Referential Example 2

By a similar operation as in Referential Example 1, a green pigment dispersion was obtained by using PG36 (17 parts) and a quinophthalone yellow pigment (C.I. Pigment Yellow 138) (13 parts) in place of the pigments.

Fabrication Example of the Color Filter

Example E-1

To fabricate an RGB color filter, R, G and B coating formulations for the color filter were obtained based on formulas shown below in Table 3.

TABLE 3

| Formula (parts) | Coating formulation for color filter R | G | B |
|---|---|---|---|
| Red pigment dispersion of Referential Example 1 | 100 | — | — |
| Green pigment dispersion of Referential Example 2 | — | 100 | — |
| Blue pigment dispersion of Example D-1 | — | — | 85 |

TABLE 3-continued

|  | Coating formulation for color filter | | |
|---|---|---|---|
| Formula (parts) | R | G | B |
| Violet pigment dispersion of Example C-1 | — | — | 15 |
| Acrylic resin varnish | 50 | 50 | 50 |
| Trimethylolpropane acrylate | 10 | 10 | 10 |
| 2-Hydroxy-2-methylpropiophenone | 2 | 2 | 2 |
| 2,2-Diethoxyacetophenone | 1 | 1 | 1 |
| PGMAc | 37 | 37 | 37 |
| Total | 200 | 200 | 200 |

A glass substrate which had been subjected to treatment with a silane coupling agent was placed on a spin coater. The R coating formulation of Table 3 was spin-coated under conditions of firstly 300 rpm and 5 seconds and then 1,200 rpm and 5 seconds. Prebaking was then conducted at 80° C. for 10 minutes, a photomask with a mosaic pattern defined therein was brought into close contact with the resultant prebaked film, and by using an ultra-high pressure mercury vapor lamp, exposure was then conducted at a light quantity of 100 mJ/cm². Development and washing were then conducted with a dedicated developer and a dedicated rinse to form a red mosaic pattern (pixels) on the glass substrate.

Following the above-described procedures, coating and baking were conducted with the G and B coating formulations of Table 3 to form a green mosaic pattern and a blue mosaic pattern so that a color filter having RGB pixels was obtained. The thus-obtained color filter had properties excellent in fastness such as lightfastness and heat resistance and also superb in spectral transmittance characteristics, and exhibited excellent properties as a color filter for a liquid-crystal color display.

INDUSTRIAL APPLICABILITY

The organic-pigment dispersant of the present invention can stably disperse various organic pigments at high concentration and with low viscosity in dispersion media for paints, printing inks, coating formulations for color filters, and the like. The pigment composition and dispersion of the present invention are useful as colorants for coating formulations for color filters and, when PB15:6 and PV23 are combined as a pigment, can form blue pixels which have excellent spectral transmittance characteristics, are vivid, bright and highly-transparent, and moreover, are excellent in various fastness such as lightfastness, heat resistance, solvent resistance, chemical resistance and waterproofness.

The invention claimed is:

1. A dispersant for an organic pigment, comprising a compound represented by the following formula (1) or (2):

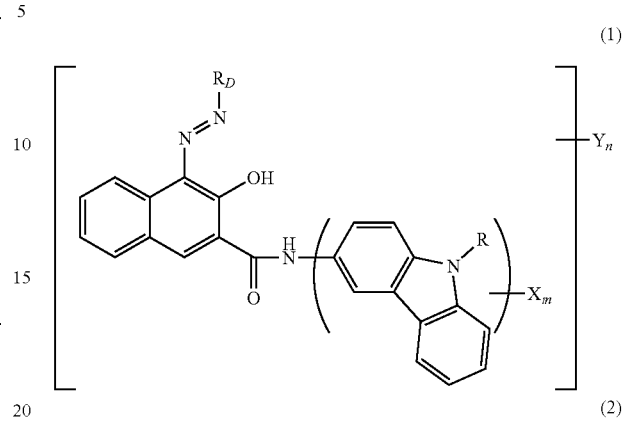

(1)

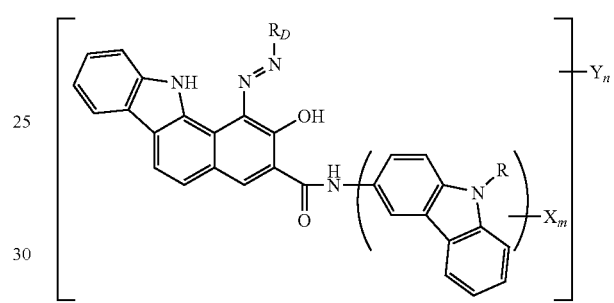

(2)

wherein $R_D$ represents an aromatic ring or aromatic heteroring having from one to three groups, wherein said groups are selected from the group consisting of a sulfonic group, a metal salt of a sulfonic group, an ammonia salt of sulfonic group, an organic amine salt of a sulfonic group, and an organic quaternary compound salt of a sulfonic group, substituents X and Y may be the same or different and each represents a halogen atom, hydroxyl group, nitro group, alkyl group, alkoxyl group, or substituted or unsubstituted phthalimidomethyl group, R represents a hydrogen atom or a $C_1$-$C_{12}$ alkyl group, and m and n are each an integer of from 0 to 3.

2. A dispersant according to claim 1, wherein n and m are 0, and R is a hydrogen atom or a $C_1$-$C_4$ alkyl group.

3. A dispersant according to claim 1, wherein said organic pigment is at least one organic pigment selected from the group consisting of blue, violet, green and black pigments.

4. A dispersant according to claim 1, wherein said organic pigment is at least one organic pigment selected from the group consisting of blue and violet dioxazine pigments, blue, violet and green anthraquinone pigments, blue, violet and green azo pigments, blue and green phthalocyanine pigments, and a black carbon-black pigment.

5. A dispersant according to claim 1, wherein said organic pigment is at least one organic pigment selected from the group consistering of dioxazine violet (C.I. Pigment Violet 23), indanthrone blue (C.I. Pigment Blue 60), ε-phthalocyanine blue (C.I. Pigment Blue 15:6), chlorinated phthalocyanine green (C,I. Pigment Green 7), brominated chlorinated phthalocyanine green (C.I. Pigment Green 36), brominated phthalocyanine green, and carbon black (C.I. Pigment Black 7).

6. A pigment composition comprising an organic pigment and a dispersant as defined in claim 1.

7. A pigment dispersion comprising a dispersion medium and an organic pigment dispersed with a dispersant in said dispersion medium, wherein said dispersant is a dispersant as defined in claim 1.

8. A pigment dispersion according to claim 7, wherein said organic pigment and said dispersant are contained at a ratio of from 1 to 100 parts by weight of dispersant per 100 parts by weight of organic pigment.

9. A color coating formulation for a color filter, said formulation comprising a resin varnish for said color filter and an organic pigment dispersed with a dispersant in said varnish, wherein said dispersant is a dispersant as defined in claim 1.

10. A color coating formulation according to claim 9, wherein said organic pigment is at least one organic pigment selected from the group consisting of blue, violet, green and black organic pigments.

11. A color coating formulation according to claim 9, wherein said organic pigment is at least one organic pigment selected from the group consisting of $\epsilon$-phthalocyanine blue (C.I. Pigment Blue 15:6) and dioxazine violet (C.I. Pigment Violet 23).

12. A process for fabricating a color filter, comprising the step of forming color patterns of red color, green color and blue color on a color filter substrate, wherein at least said blue color pattern is formed using a color coating formulation as defined in claim 9.

13. A color filter fabricated by a process as defined in claim 12.

* * * * *